(12) United States Patent
Niikuni

(10) Patent No.: US 11,320,824 B2
(45) Date of Patent: May 3, 2022

(54) VEHICLE

(71) Applicant: TOYOTA JIDOSHA KABUSHIKI KAISHA, Aichi-ken (JP)

(72) Inventor: Hiroshi Niikuni, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 65 days.

(21) Appl. No.: 16/752,696

(22) Filed: Jan. 27, 2020

(65) Prior Publication Data

US 2020/0264617 A1 Aug. 20, 2020

(30) Foreign Application Priority Data

Feb. 20, 2019 (JP) .............................. JP2019-028919

(51) Int. Cl.
*B60J 5/06* (2006.01)
*B62D 6/00* (2006.01)
*E05F 15/73* (2015.01)
*G05D 1/02* (2020.01)

(52) U.S. Cl.
CPC .............. *G05D 1/0212* (2013.01); *B60J 5/06* (2013.01); *B62D 6/00* (2013.01); *E05F 15/73* (2015.01); *E05Y 2400/45* (2013.01); *E05Y 2900/531* (2013.01); *G05D 2201/0212* (2013.01); *G05D 2201/0213* (2013.01)

(58) Field of Classification Search
CPC ......... G05D 1/0212; G05D 2201/0213; G05D 2201/0212; E05Y 2900/531; E05Y 2400/45; B62D 6/00; B60J 5/06; E05F 15/07
See application file for complete search history.

(56) References Cited

U.S. PATENT DOCUMENTS

| | | | |
|---|---|---|---|
| 10,384,519 B1 * | 8/2019 | Brown | E05F 15/649 |
| 2009/0200833 A1 * | 8/2009 | Heuel | B60J 5/06 |
| | | | 296/155 |
| 2018/0297612 A1 | 10/2018 | Fukamachi | |

FOREIGN PATENT DOCUMENTS

| | | |
|---|---|---|
| JP | 2007-38873 A | 2/2007 |
| JP | 2007-120113 A | 5/2007 |
| JP | 2018-180946 A | 11/2018 |

* cited by examiner

*Primary Examiner* — Mathew Franklin Gordon
(74) *Attorney, Agent, or Firm* — Hauptman Ham, LLP

(57) ABSTRACT

A vehicle including: a sliding door configured to block an opening provided in a vehicle body when in a closed state, a trajectory of sliding movement of the sliding door overlapping a trajectory of turning of a steered wheel; a steering mechanism configured to turn the steered wheel; a memory; and a processor coupled to the memory, the processor being configured to: control the steering mechanism in order to perform autonomous driving, and control the steering mechanism prior to the vehicle stopping so as to adjust a steering angle of the steered wheel, such that the steered wheel moves out of the trajectory of the sliding door in a case in which the steered wheel is within the trajectory of the sliding door during autonomous driving.

5 Claims, 8 Drawing Sheets

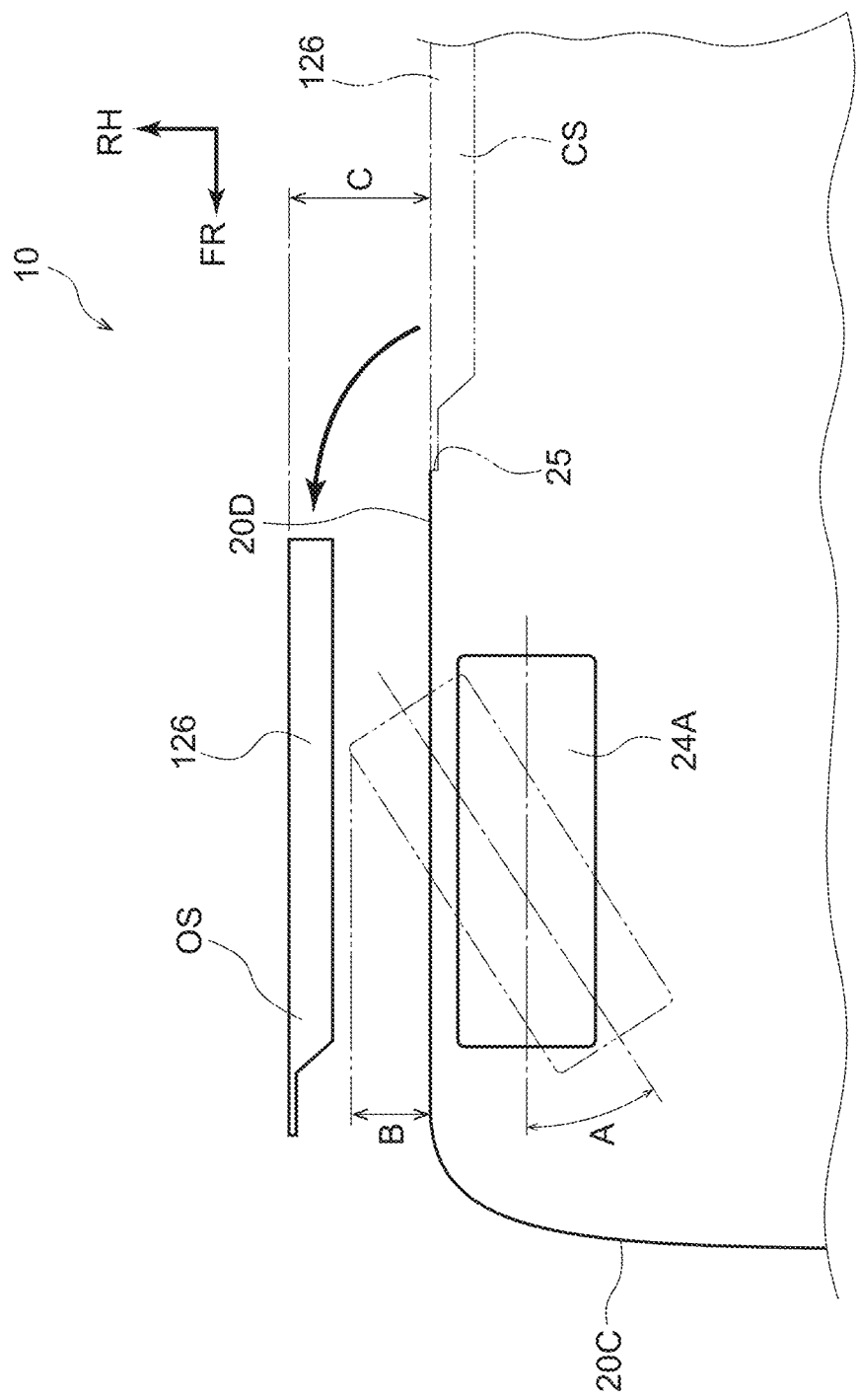

VEHICLE

CROSS-REFERENCE TO RELATED APPLICATION

This application is based on and claims priority under 35 USC 119 from Japanese Patent Application No. 2019-028919 filed on Feb. 20, 2019, the disclosure of which is incorporated by reference herein.

BACKGROUND

Technical Field

The present disclosure relates to a vehicle provided with a sliding door.

Related Art

Japanese Patent Application Laid-Open (JP-A) No. 2018-180946 discloses a autonomous vehicle that travels by autonomous driving toward a destination that has been set. JP-A No. 2007-038873 discloses a manually driven vehicle including a front wheel steering angle drive means capable of changing the steering angle of a front wheel, and a door state adjustment means that controls driving of the front wheel steering angle drive means such that the front wheel steering angle becomes a steering angle that does not interfere with a sliding door when the sliding door is opened.

In autonomous vehicles such as that disclosed in JP-A No. 2018-180946, if there is a possibility of interference between a sliding door and a steered wheel, this possibility of interference between the sliding door and the steered wheel could be eliminated by providing the respective means disclosed in JP-A No. 2007-038873.

However, in order to do this a steering mechanism that only operates when opening and closing the sliding door would need to be provided in addition to a steering mechanism employed in autonomous driving, leading to a more complex, heavier structure.

SUMMARY

An object of the present disclosure is to provide a vehicle capable of suppressing interference between a sliding door and a steered wheel without providing an additional mechanism for steering.

A vehicle of a first aspect includes a sliding door configured to block an opening provided in a vehicle body when in a closed state, a trajectory of sliding movement of the sliding door overlapping a trajectory of turning of a steered wheel, a steering mechanism configured to turn the steered wheel, a drive control section configured to control the steering mechanism in order to perform autonomous driving, and a steering angle adjustment section configured to control the steering mechanism prior to the vehicle stopping so as to adjust a steering angle of the steered wheel, such that the steered wheel moves out of the trajectory of the sliding door in a case in which the steered wheel is within the trajectory of the sliding door during autonomous driving.

The vehicle of the first aspect is assumed to include the sliding door that might interfere with the steered wheel when being opened. The vehicle includes the single steering mechanism for turning the steered wheel, and the drive control section and the steering angle adjustment section control the steering mechanism to realize both turning of the steered wheel during autonomous driving, and steering angle adjustment of the steered wheel in order to avoid interference with the sliding door. The vehicle enables interference between the sliding door and the steered wheel to be suppressed without providing an additional mechanism for turning the steered wheel separately to the steering mechanism.

A vehicle of a second aspect is the vehicle of the first aspect, wherein the steering angle adjustment section is configured to control the steering mechanism so as to adjust the steering angle of the steered wheel, such that the steered wheel moves out of the trajectory of the sliding door in a case in which the vehicle has come within a predetermined range of a destination set during autonomous driving.

In the vehicle of the second aspect, the steering angle is adjusted such that the steered wheel does not interfere with the sliding door at a timing when an occupant enters or exits the vehicle. Namely, in this vehicle, during brief stops in which an occupant does not enter or exit the vehicle, the steered wheel is not adjusted to a position that avoids interference with the sliding door, such that the vehicle sets off again smoothly.

A vehicle of a third aspect is the vehicle of the first or the second aspect, wherein the steering angle adjustment section is configured to control the steering mechanism so as to adjust the steering angle of the steered wheel, such that the steered wheel moves out of the trajectory of the sliding door and points in a straight-ahead direction prior to the vehicle starting to decelerate.

In the vehicle of the third aspect, the steered wheel is pointed in a straight-ahead direction at the point in time when the vehicle decelerates. This vehicle therefore enables the orientation of the vehicle to be stabilized during deceleration and lateral acceleration imparted to an occupant to be reduced.

A vehicle of a fourth aspect is the vehicle of any one of the first to the third aspects, further including a door control section configured to stop opening of the sliding door at a half-open state prior to contacting the steered wheel in a case in which the steered wheel is within the trajectory of the sliding door during manual driving when autonomous driving is restricted.

The vehicle of the fourth aspect enables interference between the sliding door and the steered wheel to be suppressed, even during manual driving in which driver operation is prioritized.

The present disclosure enables interference between the sliding door and the steered wheel to be suppressed without providing an additional mechanism for steering.

BRIEF DESCRIPTION OF THE DRAWINGS

An exemplary embodiment of the present disclosure will be described in detail based on the following figures, wherein:

FIG. 8 is a diagram corresponding to FIG. 3, illustrating a right front wheel and a sliding door in an open state in a vehicle according to a comparative example.

DETAILED DESCRIPTION

Figure 1:
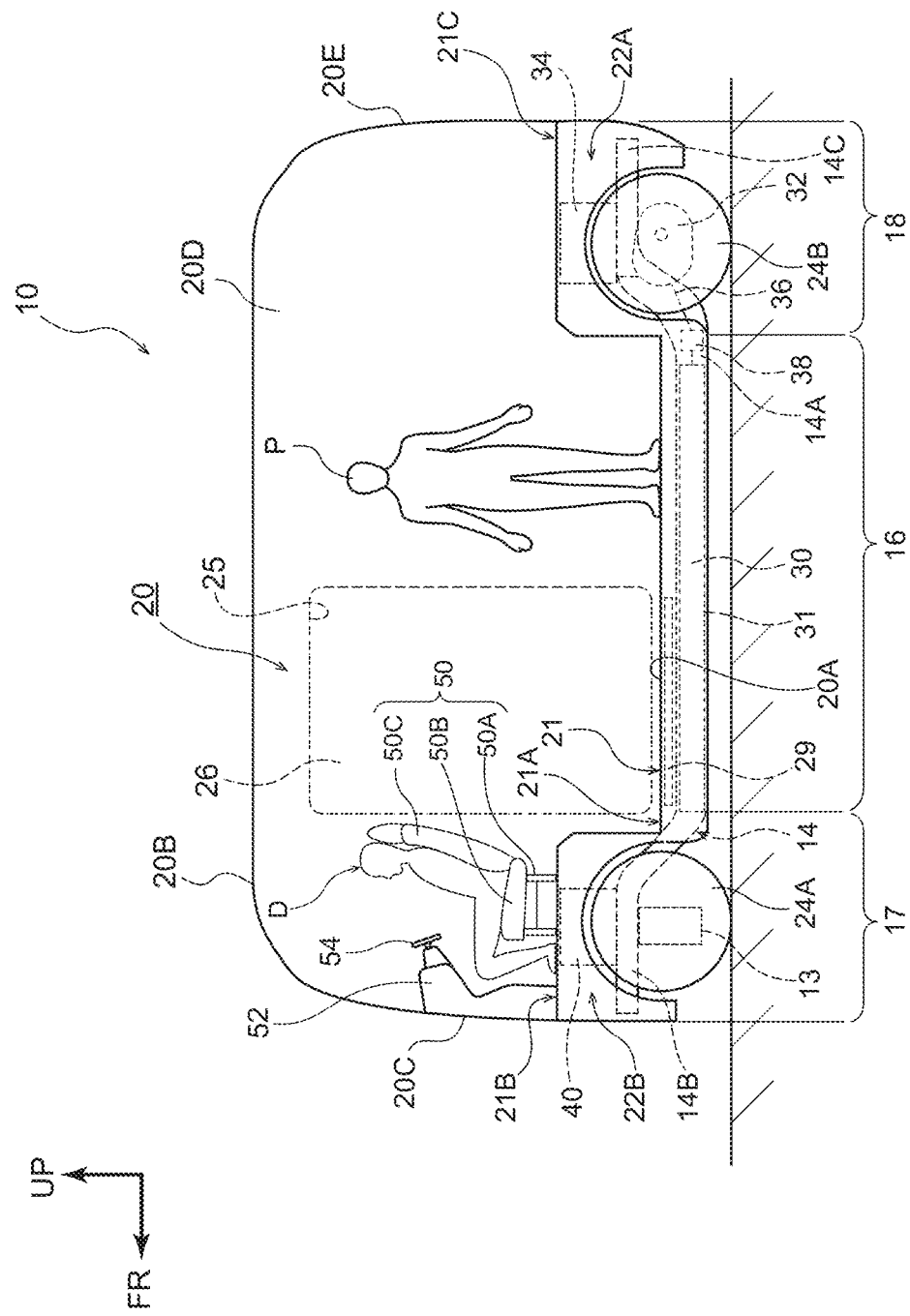
FIG. 1 is a side view of a vehicle cabin of a vehicle according to an exemplary embodiment.

Explanation follows regarding a vehicle according to an exemplary embodiment of the present disclosure, with reference to the drawings. Note that in the drawings, the arrow FR indicates a vehicle front side, the arrow UP indicates a vehicle upper side, and the arrow RH indicates a vehicle width direction right side.

Configuration

Figure 2:
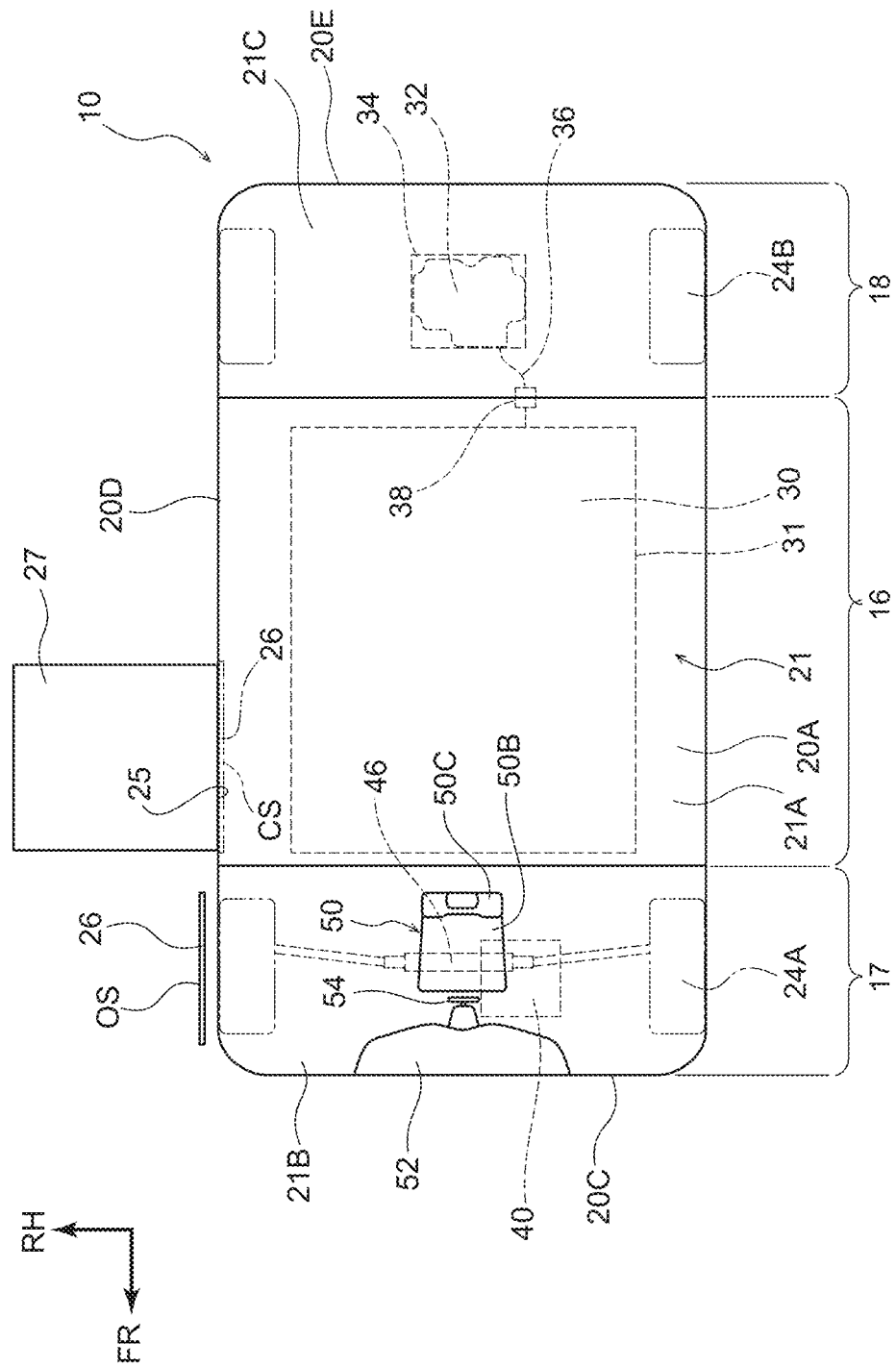
FIG. 2 is a plan view of a vehicle cabin of a vehicle according to an exemplary embodiment.

A vehicle 10 of the present exemplary embodiment is an electric vehicle capable of fully autonomous driving. As illustrated in FIG. 1 and FIG. 2, the vehicle 10 has a substantially rectangular block shaped external profile enclosed by a roof 20B, a front wall section 20C, side wall sections 20D, and a rear wall section 20E. Front wheels 24A, configuring steered wheels, are provided at the vehicle front, and rear wheels 24B are provided at the vehicle rear of the vehicle 10. The front wheels 24A are turned by a steering actuator 46, described later. The front wheels 24A are configured so as to project out past the side wall sections 20D when applied with a steering angle (see FIG. 3).

The vehicle 10 of the present exemplary embodiment is configured by joining together plural modules. The vehicle 10 is configured including a center module 16 configuring a vehicle front-rear direction central section, a front module 17 joined to the vehicle front side of the center module 16, and a rear module 18 joined to the vehicle rear side of the center module 16. A boundary between the front module 17 and the center module 16 is located slightly to the vehicle rear of the front wheels 24A, and a boundary between the center module 16 and the rear module 18 is located slightly to the vehicle front of the rear wheels 24B. Note that in the following explanation, in terms of the vehicle front-rear direction of the vehicle 10, the section where the front module 17 is located is referred to as a vehicle front section, the section where the center module 16 is located is referred to as a vehicle central section, and the section where the rear module 18 is located is referred to as a vehicle rear section.

Note that the center module 16, the front module 17, and the rear module 18 may be modules configuring only a lower side of the vehicle. In such cases, the vehicle 10 is formed by joining an additional roof module configuring the vehicle upper side to the center module 16, the front module 17, and the rear module 18 that have been joined together.

As illustrated in FIG. 1, the center module 16 is configured including vehicle front-rear direction central portions of the respective side wall sections 20D, and a battery case 31, described later. Note that plural types of center modules 16 may be prepared with different vehicle front-rear direction lengths so as to enable the overall length of the vehicle 10 to be changed.

The front module 17 is configured including the front wall section 20C, vehicle front portions of the respective side wall sections 20D, and a control device 40.

The rear module 18 is configured including the rear wall section 20E, vehicle rear portions of the respective side wall sections 20D, a drive unit 32, and a power unit 34.

A pair of side members 14 are provided extending along the vehicle front-rear direction at the vehicle lower side of the vehicle 10. Each of the side members 14 includes a center side member 14A extending from the vehicle rear side of the front wheels 24A to the vehicle front side of the rear wheels 24B. Each of the side members 14 also includes a front side member 14B that curves from the corresponding center side member 14A toward the vehicle width direction inner side and vehicle upper side, and then extends toward the vehicle front side. Each of the side members 14 further includes a rear side member 14C that curves from the corresponding center side member 14A toward the vehicle width direction inner side and vehicle upper side, and then extends toward the vehicle rear side. Note that the center side members 14A are provided to the center module 16, the front side members 14B are provided to the front module 17, and the rear side members 14C are provided to the rear module 18.

A front axle 13 that supports the front wheels 24A is fixed to the front side members 14B, and the drive unit 32 for driving the rear wheels 24B is fixed to the rear side members 14C.

The vehicle 10 includes a power unit compartment 22A at the vehicle rear section, a sub unit compartment 22B at the vehicle front section, and a vehicle cabin 20 partitioned off from the power unit compartment 22A and the sub unit compartment 22B by a floor panel 21.

The power unit compartment 22A of the present exemplary embodiment is a section at the vehicle lower side of the vehicle rear section, and is provided as a space over a range surrounding the rear wheels 24B in side view. In addition to the drive unit 32, the power unit 34, serving as a high voltage component, is also housed in the power unit compartment 22A. The drive unit 32 includes at least a unitized vehicle travel motor and transaxle. The power unit 34 supplies power to the vehicle travel motor. The power unit 34 includes at least a unitized boost converter and inverter. The power unit 34 is electrically connected to a battery 30, described later, by a power source cable 36. The power source cable 36 is provided with a power connector 38 at a join portion between the center module 16 and the rear module 18.

The sub unit compartment 22B of the present exemplary embodiment is a section at the vehicle lower side of the vehicle front section, and is provided as a space over a range surrounding the front wheels 24A in side view. The control device 40 is housed in the sub unit compartment 22B. Plural environmental sensors 44 (see FIG. 4) that ascertain the situation in the surroundings of the vehicle 10 are connected to the control device 40 through signal cables.

The battery 30 is housed under the floor of the vehicle cabin 20, specifically, at the vehicle lower side of the floor panel 21 at the vehicle central section. More specifically, the battery 30 is provided between the pair of center side members 14A disposed at the vehicle central section, and is housed in the battery case 31 that is fixed to the center side members 14A.

In the present exemplary embodiment, a floor surface 20A, serving as a floor, is formed by the floor panel 21 that partitions the vehicle cabin 20 from the power unit compartment 22A, the sub unit compartment 22B, and the battery case 31. The floor panel 21 includes a lower floor section 21A provided at the vehicle central section, a raised front floor section 21B provided at the vehicle front section at a higher position than the floor surface 20A at the lower floor section 21A, and a raised rear floor section 21C provided at the vehicle rear section at a higher position than the floor surface 20A at the lower floor section 21A.

The control device 40 is disposed at the vehicle lower side of the raised front floor section 21B. The raised front floor section 21B is positioned further toward the vehicle upper side than a vehicle axle shaft of the front wheels 24A. The drive unit 32 and the power unit 34 are disposed at the vehicle lower side of the raised rear floor section 21C. The raised rear floor section 21C is positioned further toward the vehicle upper side than a vehicle axle shaft of the rear wheels 24B. Note that although the raised front floor section 21B and the raised rear floor section 21C are at substantially the same height as each other in the present exemplary embodiment, the raised front floor section 21B and the raised rear floor section 21C may be at different heights to each other.

The lower floor section 21A is positioned further toward the vehicle lower side than the vehicle axle shafts of the front wheels 24A and the rear wheels 24B. The battery case 31 is disposed at the vehicle lower side of the lower floor section 21A. The vehicle cabin 20 is formed with sufficient height for an onboard occupant P of the vehicle 10 to stand upright on the lower floor section 21A. Note that the occupant P may be exemplified by a dummy of an adult with a standard (average) build, such as a world side impact dummy (world SID) of an American adult male in the 50$^{th}$ percentile (AM50). Namely, the vehicle cabin 20 of the present exemplary embodiment has a height at which there is clearance between the head of an AM50 dummy and the roof 20B in a state in which the AM50 dummy is standing upright on the lower floor section 21A. Note that the example of an occupant P is not limited to an AM50 dummy, and may be another crash test dummy or a model with a statistically obtained standard build.

A seat 50, serving as a driving seat on which a driver D can sit, is provided on the raised front floor section 21B. The seat 50 includes a frame 50A fixed to the floor surface 20A, a seat cushion 50B fixed to the frame 50A and including a seat surface, and a seatback 50C fixed to the seat rear side of the seat cushion 50B. A dashboard 52 is disposed running along the front wall section 20C at the vehicle front side of the seat 50. A steering wheel 54 is disposed on the dashboard 52 so as to face the driver D. Pedals (an accelerator pedal and a brake pedal) are disposed at the vehicle lower side of the dashboard 52.

Figure 3:
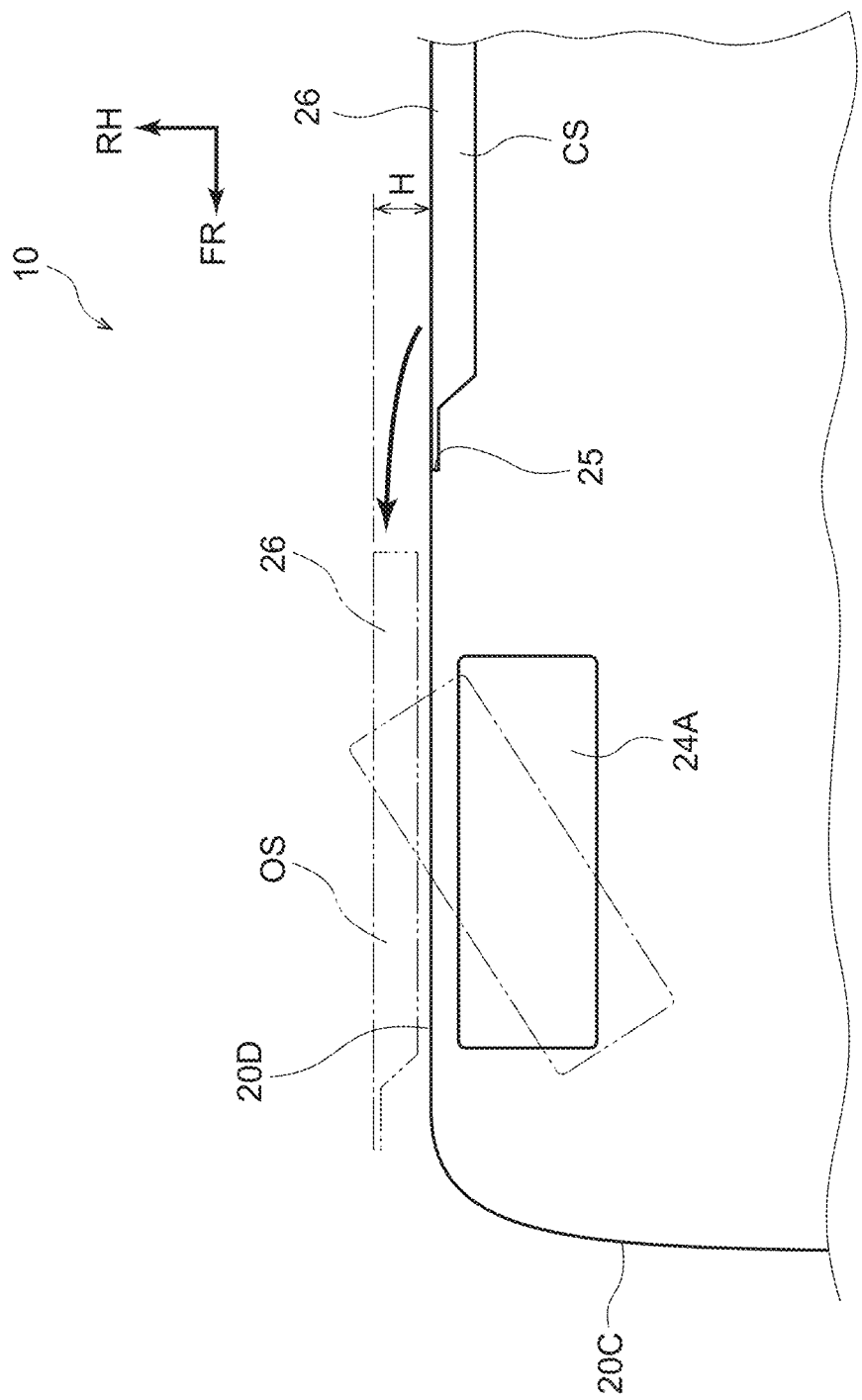
FIG. 3 is an enlarged view of FIG. 2, illustrating a right front wheel and a sliding door in a closed state in a vehicle according to an exemplary embodiment.

As illustrated in FIG. 2, an entrance/exit 25, serving as an opening enabling an adult occupant P to walk onto or off the vehicle, is provided in the side wall section 20D on the vehicle width direction right side of the vehicle cabin 20. The entrance/exit 25 is closed off by a sliding door 26 that is slidably fixed to the vehicle front of the entrance/exit 25. As illustrated in FIG. 3, the sliding door 26 of the present exemplary embodiment is moved from a closed state CS in which the entrance/exit 25 is closed off to an open state OS in which the entrance/exit 25 is open by moving toward the vehicle front side while also moving toward the vehicle width direction outer side. In the present exemplary embodiment, a trajectory of slide movement of the sliding door 26 overlaps a trajectory of turning of the corresponding front wheel 24A (see the double-dotted dashed line in FIG. 3).

A ramp 27 is housed in a side housing section 28 (see FIG. 1) provided in a gap between the floor panel 21 and the battery case 31 when the vehicle 10 is traveling, and is pulled out to the side of the vehicle from the side housing section 28 when in an in-use state for an occupant P to enter or exit the vehicle. A wheelchair is able to travel over the ramp 27.

Figure 4:
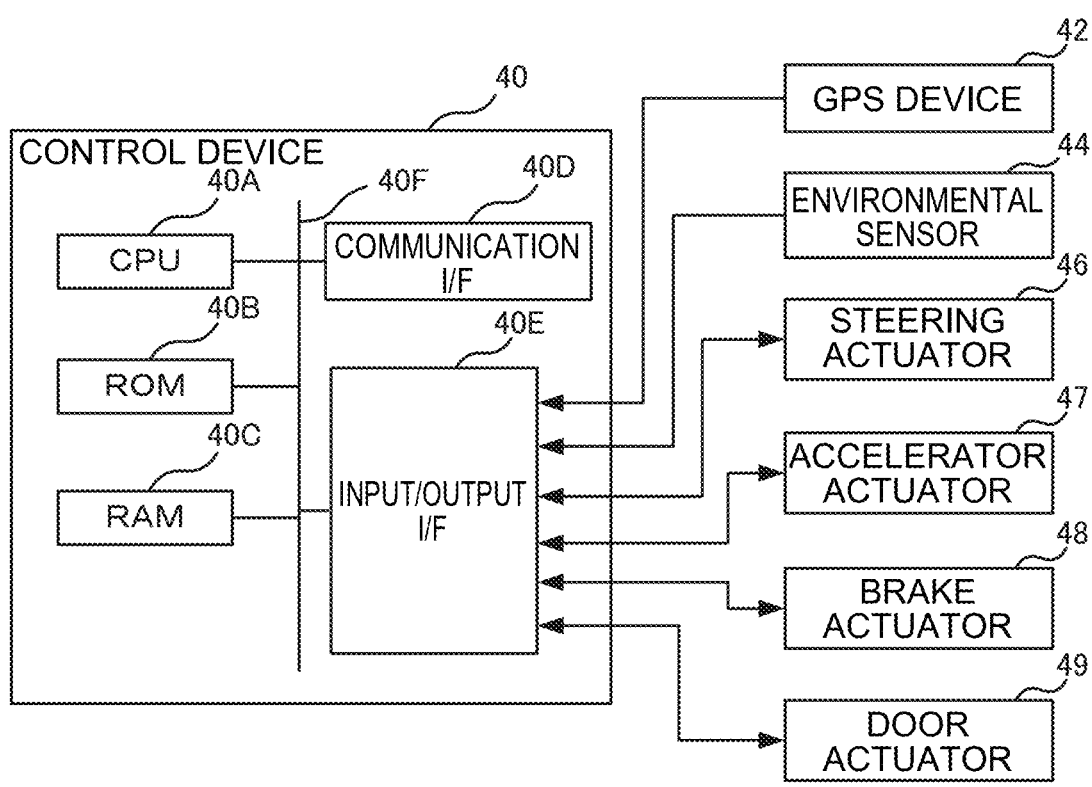
FIG. 4 is a block diagram illustrating a hardware configuration of a control device of a vehicle according to an exemplary embodiment.

FIG. 4 is a block diagram illustrating hardware configuration of devices installed to the vehicle 10 of the present exemplary embodiment. In addition to the above-mentioned control device 40, the vehicle 10 also includes a global positioning system (GPS) device 42 that acquires the current position of the vehicle 10, and the environmental sensors 44 used to perceive the environment in the surroundings of the vehicle 10. The environmental sensors 44 include a camera that images a predetermined range, millimeter-wave radar that transmits exploratory waves over a predetermined range, and light detection and ranging/laser imaging detection and ranging (LIDAR) that scans a predetermined range.

The vehicle 10 also includes the steering actuator 46 serving as a steering mechanism, an accelerator actuator 47, a brake actuator 48, and a door actuator 49, respectively serving as various actuators. The steering actuator 46 is an actuator for steering the front wheels 24A. The accelerator actuator 47 controls the vehicle travel motor to cause the vehicle 10 to accelerate or decelerate. The brake actuator 48 controls the brakes to cause the vehicle 10 to decelerate.

Figure 6:
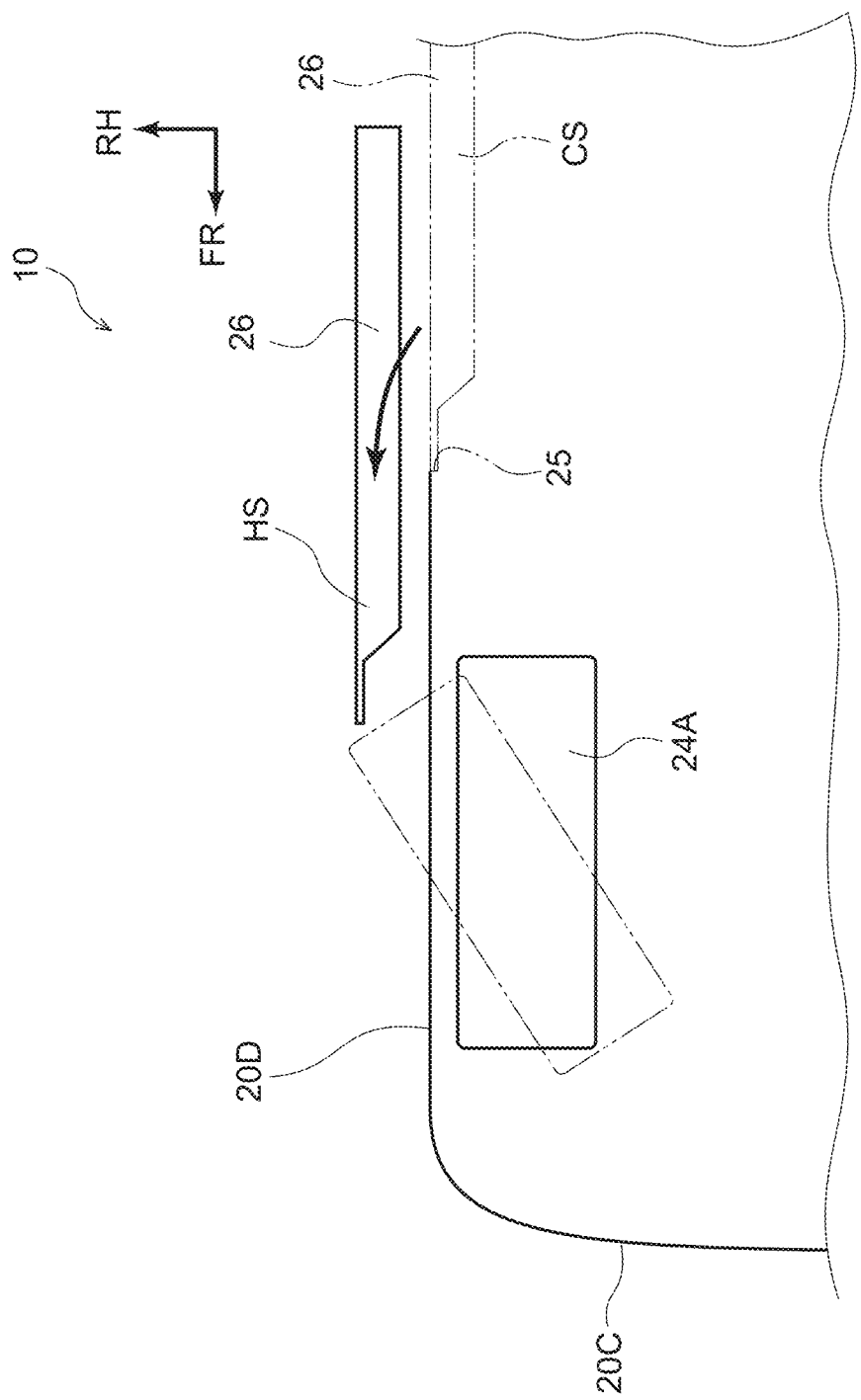
FIG. 6 is a diagram corresponding to FIG. 3, illustrating a right front wheel and a sliding door in a half-open state in a vehicle according to an exemplary embodiment.

The door actuator 49 is an actuator for opening and closing the sliding door 26. Specifically, the door actuator 49 is configured to slide the sliding door 26 between the closed state CS and the open state OS (see FIG. 3). The door actuator 49 is also configured to stop the sliding door 26 at a half-open state HS position, described later (see FIG. 6).

The control device 40 is configured including a central processing unit (CPU) 40A, read only memory (ROM) 40B, random access memory (RAM) 40C, a communication interface (I/F) 40D, and an input/output I/F 40E. The CPU 40A, the ROM 40B, the RAM 40C, the communication I/F 40D, and the input/output I/F 40E are connected so as to be capable of communicating with each other through a bus 40F.

The CPU 40A is a central processing unit that executes various programs and controls various sections. Namely, the CPU 40A reads a program from the ROM 40B and executes the program in the RAM 40C, serving as a workspace. In the present exemplary embodiment, an executable program is stored in the ROM 40B. The CPU 40A functions as a position acquisition section 251, an environment perception section 252, a travel plan generation section 254, a drive control section 256, a steering angle adjustment section 258, and a door control section 260, all illustrated in FIG. 5, by executing the executable program.

The ROM 40B stores various programs and various data. The RAM 40C serves as a workspace where a program or data is temporarily stored.

The communication I/F 40D is an interface for communicating with other vehicles, an external server, or the like, and employs protocol such as Ethernet (registered trademark), FDDI, or Wi-Fi (registered trademark).

The input/output I/F 40E is an interface for communicating with various devices installed in the vehicle 10. In the control device 40 of the present exemplary embodiment, the GPS device 42, the environmental sensors 44, the steering actuator 46, the accelerator actuator 47, the brake actuator 48, and the door actuator 49 are connected together through the input/output I/F 40E. Note that the GPS device 42, the environmental sensors 44, the steering actuator 46, the accelerator actuator 47, the brake actuator 48, and the door actuator 49 may be directly connected to the bus 40F. Alternatively, these devices may be connected through a controller area network (CAN), or may be connected via various ECUs or a gateway ECU.

Figure 5:
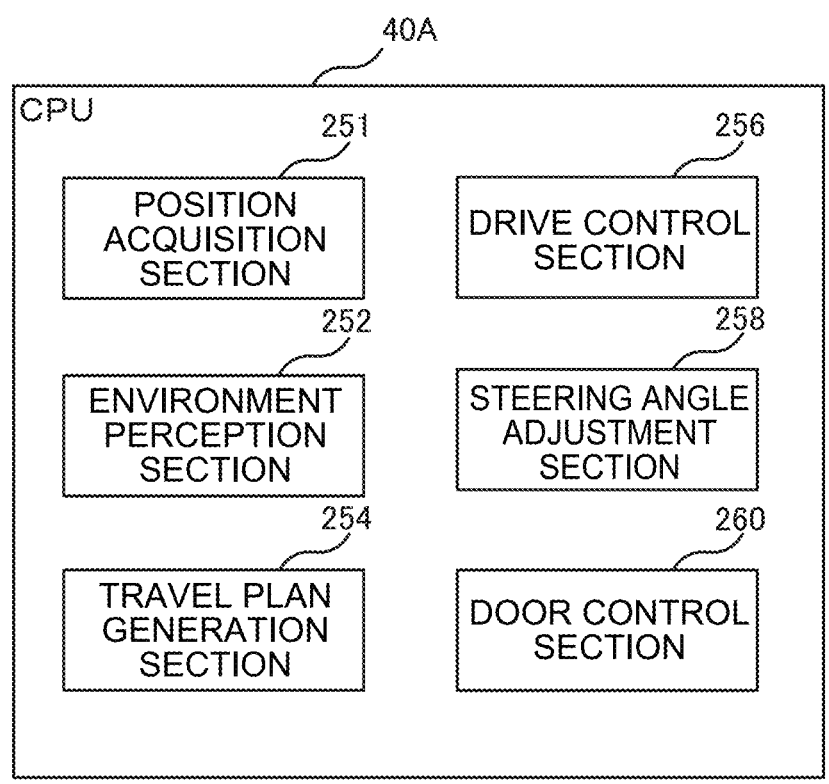
FIG. 5 is a block diagram illustrating an example of functional configuration of a CPU of a control device of a vehicle according to an exemplary embodiment.

FIG. 5 is a block diagram illustrating an example of functional configuration of the CPU 40A. As illustrated in FIG. 5, the CPU 40A includes the position acquisition section 251, the environment perception section 252, the travel plan generation section 254, the drive control section 256, the steering angle adjustment section 258, and the door control section 260. These functional configurations are implemented by the CPU 40A reading and executing the executable program stored in the ROM 40B.

The position acquisition section 251 includes a function to acquire the current position of the vehicle 10. The position acquisition section 251 acquires position information from the GPS device 42 though the input/output I/F 40E.

The environment perception section 252 includes a function used to perceive the travel environment in the surroundings of the vehicle 10. The environment perception section 252 ascertains the travel environment of the vehicle 10 from the environmental sensors 44 through the input/output I/F 40E as travel environment information. The "travel environment information" includes the weather, brightness, road width, obstacles, and the like in the surroundings of the vehicle 10.

The travel plan generation section 254 includes a function to generate a travel plan, this being a scheduled course of travel of the vehicle 10. For example, when an occupant P designates a location to travel to, the travel plan generation section 254 sets the destination and generates a travel plan so as to travel to the destination by taking the optimal route.

The drive control section 256 includes a function to control the autonomous driving of the vehicle 10. Specifically, the drive control section 256 causes the vehicle 10 to travel by operating the steering actuator 46, the accelerator actuator 47, and the brake actuator 48 according to the generated travel plan while taking into account the position information and the travel environment information.

The steering angle adjustment section 258 includes a function to adjust the steering angle of the front wheels 24A by controlling the steering actuator 46. The steering angle adjustment section 258 performs control to intervene in the control by the drive control section 256 and turn the front wheels 24A in response to predetermined triggers. Note that control by the drive control section 256 is prioritized during cornering, collision avoidance, and the like.

For example, during autonomous driving of the vehicle 10, in a case in which the corresponding front wheel 24A is at a steering angle at which the corresponding front wheel 24A is within the trajectory of the sliding door 26, the steering actuator 46 is controlled prior to the vehicle 10 stopping to adjust the steering angle such that the front wheel 24A is placed in an interference-free position away from the trajectory of the sliding door 26. In particular, when the vehicle 10 comes within a predetermined range of the set destination during autonomous driving, the steering angle adjustment section 258 controls the steering actuator 46 to adjust the steering angle such that the front wheel 24A is placed in the interference-free position.

Alternatively, for example, prior to the vehicle 10 starting to decelerate, the steering angle adjustment section 258 controls the steering actuator 46 to adjust the steering angle such that the front wheel 24A moves out of the trajectory of the sliding door 26 and points in a straight-ahead direction.

The door control section 260 includes a function to open and close the sliding door 26 by controlling the door actuator 49. The door control section 260 performs control to place the sliding door 26 in the closed state CS or the open state OS. Moreover, in a case in which the corresponding front wheel 24A is at a steering angle at which the corresponding front wheel 24A is within the trajectory of the sliding door 26 during manual driving when autonomous driving is restricted, the door control section 260 stops opening of the sliding door 26 at the half-open state HS prior to the sliding door 26 contacting the front wheel 24A (see FIG. 6).

Operation

In the vehicle 10 of the present exemplary embodiment, in cases in which the corresponding front wheel 24A is at a steering angle that might interfere with the sliding door 26 in the open state OS, interference between the two is avoided using the functionality of the CPU 40A. Explanation follows regarding a flow of interference avoidance processing using the flowchart in FIG. 7.

Figure 7:
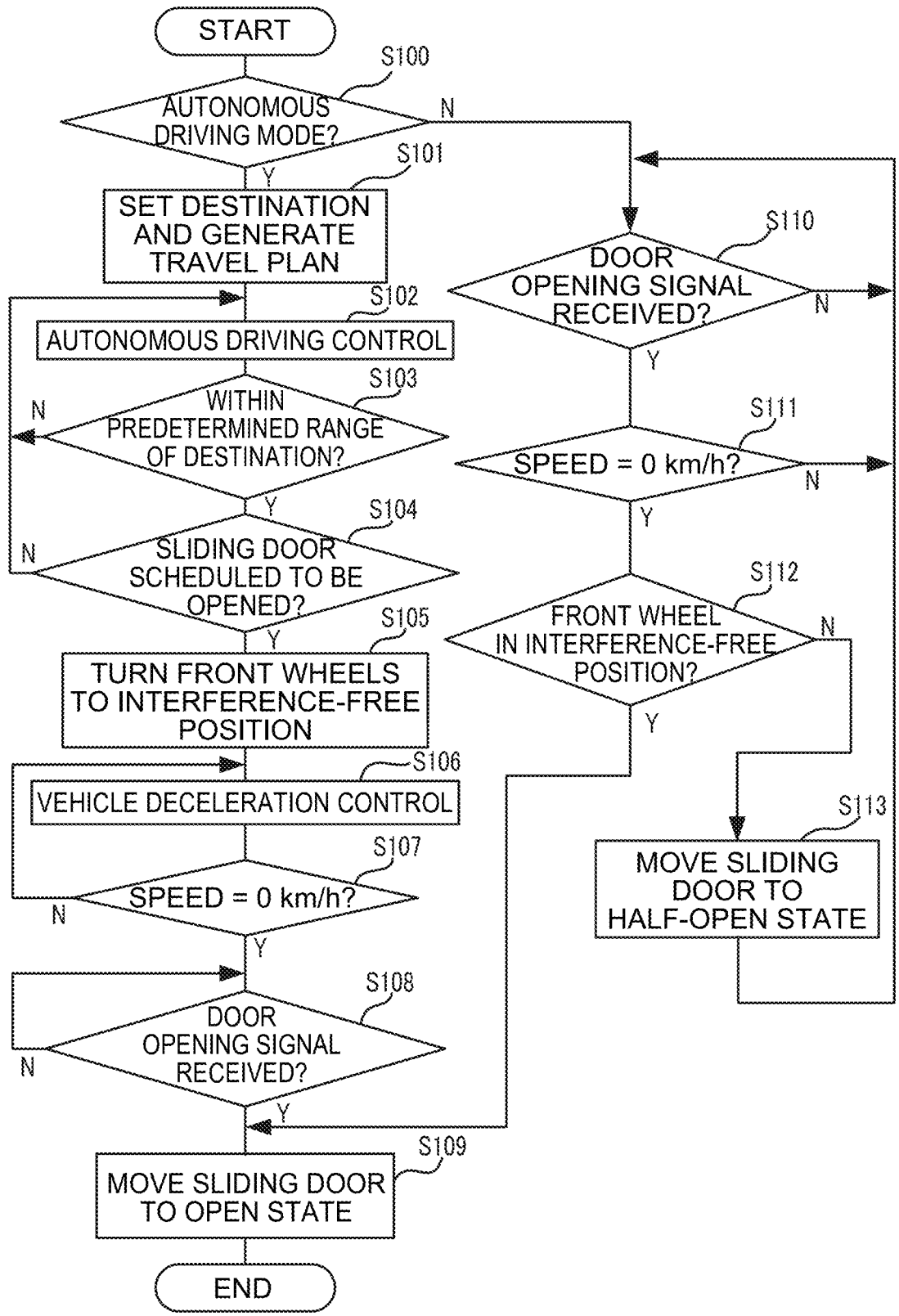
FIG. 7 is a flowchart illustrating an example of a flow of interference avoidance processing performed by a control device of a vehicle according to an exemplary embodiment.

At step S100 in FIG. 7, the CPU 40A determines whether or not the vehicle 10 is in an autonomous driving mode in which the vehicle 10 travels by autonomous driving. In a case in which the CPU 40A determines that the vehicle 10 is in the autonomous driving mode under the control of the drive control section 256, processing proceeds to step S101. In a case in which the CPU 40A determines that the vehicle 10 is not in the autonomous driving mode, namely, that the vehicle 10 is in a manually driven mode operated by the driver, processing proceeds to step S110.

At step S101, the CPU 40A sets the destination and generates a travel plan to the destination. Note that the generated travel plan may include destinations en route in addition to the ultimate arrival destination. Processing then proceeds to step S102.

At step S102, the CPU 40A performs autonomous driving control of the vehicle 10. Processing then proceeds to step S103.

At step S103, the CPU 40A determines whether or not the vehicle 10 has come within a predetermined range of the destination. Note that the "predetermined range" may be defined by a distance centered on the destination, or may be defined by a travel distance on the route to the destination. In a case in which the CPU 40A determines that the vehicle 10 has come within the predetermined range of the destination, processing proceeds to step S104. In a case in which the CPU 40A determines that the vehicle 10 has not come within the predetermined range of the destination, processing returns to step S102.

At step S104, the CPU 40A determines whether or not the sliding door 26 is scheduled to be opened while the vehicle 10 is stationary. An opening schedule of the sliding door 26 may be included in the travel plan as information regarding entry and exit of occupants P. In a case in which the CPU 40A determines that the sliding door 26 is scheduled to be opened, processing proceeds to step S105. In a case in which the CPU 40A determines that the sliding door 26 is not scheduled to be opened, processing returns to step S102.

At step S105, the CPU 40A turns the front wheels 24A to the interference-free position so as not to interfere with the sliding door 26. The steering angle of the front wheels 24A at the interference-free position may be any angle where there is no interference with the sliding door 26, and does not necessarily have to be 0 degrees with respect to the straight-ahead direction. Processing then proceeds to step S106.

At step S106, the CPU 40A performs deceleration control of the vehicle 10.

Namely, the vehicle 10 starts to decelerate as it approaches the destination. Processing then proceeds to step S107.

At step S107, the CPU 40A determines whether or not the speed of the vehicle 10 is 0 km/h, namely, whether or not the vehicle 10 has stopped. In a case in which the CPU 40A determines that the speed of the vehicle 10 is 0 km/h, processing proceeds to step S108. In a case in which the CPU 40A determines that the speed of the vehicle 10 is not 0 km/h, namely, that the vehicle 10 is still traveling, processing returns to step S106.

At step S108, the CPU 40A determines whether or not a door opening signal for opening the sliding door 26 has been received. The door opening signal is for example output to the control device 40 when an occupant P operates a door switch. In a case in which the CPU 40A determines that the door opening signal has been received, processing proceeds to step S109. In a case in which the CPU 40A determines that the door opening signal has not been received, the processing of step S108 is repeated.

At step S109, the CPU 40A slides the sliding door 26 toward the open state OS. The CPU 40A then ends the interference avoidance processing.

In a case in which the vehicle 10 is in the manually driven mode, at step S110, the CPU 40A determines whether or not the door opening signal for opening the sliding door 26 has been received. In a case in which the CPU 40A determines that the door opening signal has been received, processing proceeds to step S111. In a case in which the CPU 40A determines that the door opening signal has not been received, the processing of step S110 is repeated.

At step S111, the CPU 40A determines whether or not the speed of the vehicle 10 is 0 km/h, namely, whether or not the vehicle 10 has stopped. In a case in which the CPU 40A determines that the speed of the vehicle 10 is 0 km/h, processing proceeds to step S112. In a case in which the CPU 40A determines that the speed of the vehicle 10 is not 0 km/h, namely, that the vehicle 10 is still traveling, processing returns to step S110.

At step S112, the CPU 40A determines whether or not the corresponding front wheel 24A is in the interference-free position. In a case in which the CPU 40A determines that the front wheel 24A is in the interference-free position, processing proceeds to step S109. In a case in which the CPU 40A determines that the front wheel 24A is not in the interference-free position, processing proceeds to step S113.

At step S113, the CPU 40A moves the sliding door 26 toward the half-open state HS. Processing then returns to step S110.

The vehicle 10 of the present exemplary embodiment includes the steering actuator 46 as a single drive mechanism for turning the front wheels 24A. The CPU 40A, which functions as both the drive control section 256 and the steering angle adjustment section 258, controls the steering actuator 46, thereby realizing both turning of the front wheels 24A during autonomous driving, and steering angle adjustment of the front wheels 24A in order to avoid interference with the sliding door 26.

Note that if a mechanical steering mechanism that only operates when a sliding door is opened or closed is provided in addition to a steering mechanism used during a driving operation, as in JP-A No. 2007-038873 described previously, the mechanisms become complex, installation constraints arise, and there is an increase in weight and cost. In contrast thereto, in the vehicle 10 of the present exemplary embodiment, interference between the sliding door 26 and the corresponding front wheel 24A can be suppressed without providing an additional mechanism for steering separately to the steering actuator 46. Namely, the present exemplary embodiment enables mechanism complexity, installation constraints, and an increase in weight and cost to all be suppressed.

FIG. 8 illustrates a comparative example in which the steering angle of the front wheels 24A is not adjusted. As illustrated in FIG. 8, due to the relationship between an external dimension of the corresponding front wheel 24A and a steering angle A, an outermost portion of the front wheel 24A on the vehicle width direction outer side projects out to the vehicle width direction outer side by an offset amount B. To allow for tolerance, a sliding door 126 that opens toward the front wheel 24A needs to slide toward the vehicle width direction outer side by an offset amount C in order to avoid interference with the front wheel 24A. Namely, as in the comparative example, in cases in which the steering angle of the front wheels 24A is not adjusted the sliding door 126 projects out a long way in the vehicle width direction when in the open state OS.

In contrast thereto, the present exemplary embodiment enables control to suppress interference between the sliding door 26 and the corresponding front wheel 24A, such that an offset amount H of the sliding door 26 (see FIG. 3) is less than in the comparative example.

Moreover, in the present exemplary embodiment, the steering angle is adjusted and the front wheels 24A are turned to the interference-free position such that corresponding front wheel 24A does not interfere with the sliding door 26 at a timing when an occupant P enters or exits the vehicle. In the present exemplary embodiment, during brief stops in which an occupant P does not enter or exit the vehicle the front wheels 24A are not turned to the interference-free position and the steering angle is maintained. Thus, the vehicle 10 starts to travel at the same steering angle when setting off again, thereby preventing snaking of the vehicle 10. Namely, in the present exemplary embodiment, the vehicle 10 sets off again smoothly.

In the present exemplary embodiment, the front wheels 24A are pointed in the straight-ahead direction at the point in time when the vehicle 10 decelerates. Thus, in the vehicle 10 of the present exemplary embodiment, the orientation of the vehicle is stabilized during deceleration, thereby reducing the braking distance. Moreover, lateral acceleration imparted to an occupant P is reduced, enabling the safety of the occupant P to be secured.

Furthermore, the vehicle 10 of the present exemplary embodiment is configured so as to be capable of switching between the autonomous driving mode and the manually driven mode. In the manually driven mode, the driver D operates the steering wheel 54, and the steering actuator 46 electrically connected to the steering wheel 54 turns the front wheels 24A. Thus, in the manually driven mode, the front wheels 24A are not turned to the interference-free position prior to stopping, even if there is a possibility that the sliding door 26 and the corresponding front wheel 24A might interfere with each other. To address this, in the present exemplary embodiment, if there is a possibility that the sliding door 26 and the corresponding front wheel 24A might interfere with each other while in the manually driven mode, the opening sliding door 26 is stopped at the vehicle rear side of the front wheel 24A. The present exemplary embodiment thereby enables interference between the sliding door 26 and the corresponding front wheel 24A to be suppressed, even in the manually driven mode in which operation by the driver D is prioritized. Namely, the system to suppress interference between the sliding door 26 and the front wheel 24A can be applied to both autonomous driving and manual driving.

Other Remarks

Although the exemplary embodiment described above describes the example of the sliding door 26 that slides in the vehicle front-rear direction and that might interfere with the corresponding front wheel 24A, there is no limitation thereto. For example, the present disclosure may be applied to a sliding door that slides toward the corresponding front wheel 24A from the vehicle upper side of the front wheel 24A. Alternatively, the present disclosure may be applied to a sliding door that is provided to the front wall section 20C and that slides along the vehicle body while veering toward the side wall sections 20D.

Although only the front wheels 24A are steered in the exemplary embodiment described above, there is no limitation thereto, and configuration may be made such that both the front wheels 24A and the rear wheels 24B are steered, or only the rear wheels 24B are steered. Namely, the present disclosure may also be applied in cases in which a rear wheel 24B might interfere with a sliding door.

Although the drive control section 256 and the steering angle adjustment section 258 are consolidated into a single unit configured by the control device 40 in the exemplary embodiment described above, there is no limitation thereto. A control device for autonomous driving and a control device for steering angle adjustment may be provided as separate units. For example, an autonomous driving unit for autonomous driving may be provided with the functionality of the drive control section 256, and an ECU for steering may be provided with the functionality of the steering angle adjustment section 258, with the autonomous driving unit and the ECU coordinating control to turn the front wheels 24A.

Note that the interference avoidance processing executed by the CPU 40A reading and executing software (a program) in the above exemplary embodiment may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The interference avoidance processing may be executed by any one of these various types of processor, or by a combination of two or more of the same type or different types of processor (such as a plural FPGAs, or a combination of a CPU and an FPGA). The hardware structure of these various types of processors is more specifically an electric circuit combining circuit elements such as semiconductor elements.

In the above exemplary embodiment, the program is in a format pre-stored (installed) in a computer-readable non-transitory recording medium. For example, the executable program of the control device 40 of the vehicle 10 is pre-stored in the ROM 40B. However, there is no limitation thereto, and the executable program may be provided in a format recorded on a non-transitory recording medium such as compact disc read only memory (CD-ROM), digital versatile disc read only memory (DVD-ROM), or universal serial bus (USB) memory. Alternatively, the executable program may be provided in a format downloaded from an external device through a network.

The flow of processing explained in the above exemplary embodiment is merely an example, and superfluous steps may be omitted, new steps may be added, or the processing sequence may be changed within a range not departing from the spirit of the present disclosure.

What is claimed is:

1. A vehicle comprising:
a sliding door configured to block an opening provided in a vehicle body when in a closed state, a trajectory of sliding movement of the sliding door overlapping a trajectory of turning of a steered wheel;
a steering mechanism configured to turn the steered wheel;
a memory; and
a processor coupled to the memory,
the processor being configured to:
control the steering mechanism in order to perform autonomous driving, and
automatically control the steering mechanism prior to the vehicle stopping so as to adjust a steering angle of the steered wheel, such that the steered wheel moves out of the trajectory of the sliding door in a case in which the steered wheel is within the trajectory of the sliding door during autonomous driving.

2. The vehicle of claim 1, wherein:
the processor is configured to automatically control the steering mechanism so as to adjust the steering angle of the steered wheel, such that the steered wheel moves out of the trajectory of the sliding door in a case in which the vehicle has come within a predetermined range of a destination set during autonomous driving.

3. The vehicle of claim 2, wherein:
the processor is configured to automatically control the steering mechanism so as to adjust the steering angle of the steered wheel, such that the steered wheel moves out of the trajectory of the sliding door in a case in which information that an occupant will enter or exit the vehicle is included in a travel plan for performing autonomous driving.

4. The vehicle of claim 1, wherein:
the processor is configured to automatically control the steering mechanism so as to adjust the steering angle of the steered wheel, such that the steered wheel moves out of the trajectory of the sliding door and points in a straight-ahead direction prior to the vehicle starting to decelerate.

5. The vehicle of claim 1, wherein:
the processor is configured to stop opening of the sliding door at a half-open state prior to contacting the steered wheel in a case in which the steered wheel is within the trajectory of the sliding door during manual driving when autonomous driving is restricted.

* * * * *